(12) United States Patent
Zhao et al.

(10) Patent No.: US 11,803,193 B1
(45) Date of Patent: Oct. 31, 2023

(54) POOL CLEANING ROBOT AUTOMATIC DOCKING

(71) Applicant: Degrii Co., Ltd., Jiangsu (CN)

(72) Inventors: Fei Zhao, Jiangsu (CN); Ye Zhao, Jiangsu (CN)

(73) Assignee: Degrii Co., Ltd., Suzhou (CN)

( * ) Notice: Subject to any disclaimer, the term of this patent is extended or adjusted under 35 U.S.C. 154(b) by 0 days.

(21) Appl. No.: 18/092,503

(22) Filed: Jan. 3, 2023

(30) Foreign Application Priority Data

Jun. 13, 2022 (CN) .......................... 202210659313.2

(51) Int. Cl.
*G05D 1/06* (2006.01)
*E04H 4/16* (2006.01)
*G05D 1/02* (2020.01)

(52) U.S. Cl.
CPC .......... *G05D 1/0692* (2013.01); *E04H 4/1654* (2013.01); *G05D 1/0206* (2013.01)

(58) Field of Classification Search
CPC ...... G05D 1/0692; G05D 1/0206; E04H 4/16; E04H 4/1654; E04H 4/1663; E04H 4/1672
See application file for complete search history.

(56) References Cited

U.S. PATENT DOCUMENTS

| | | | | |
|---|---|---|---|---|
| 2013/0104321 | A1* | 5/2013 | Michelon | E04H 4/1654 15/1.7 |
| 2021/0310962 | A1* | 10/2021 | Oetiker | G05D 1/0272 |
| 2022/0042335 | A1* | 2/2022 | Besnier | H04B 10/80 |
| 2022/0043450 | A1* | 2/2022 | Besnier | E04H 4/1654 |

FOREIGN PATENT DOCUMENTS

| | | | |
|---|---|---|---|
| CN | 114233063 A | 3/2022 | |
| EP | 3333343 A1 * | 6/2018 | .............. C02F 1/001 |
| JP | 2004310385 A * | 11/2004 | |

* cited by examiner

*Primary Examiner* — Aaron L Troost
(74) *Attorney, Agent, or Firm* — The Small Patent Law Group LLC; Christopher R. Carroll

(57) ABSTRACT

The present disclosure provides a method of automatic docking a pool cleaning robot, a pool cleaning robot, an electronic device and a computer storage medium. In the method, a pool cleaning robot is placed into a pool; when a docking instruction is received, a closest pool wall relative to the pool cleaning robot is determined; and the pool cleaning robot is enabled to move towards the closest pool wall.

17 Claims, 7 Drawing Sheets

POOL CLEANING ROBOT AUTOMATIC DOCKING

CROSS REFERENCE TO RELATED APPLICATIONS

This application claims priority to Chinese Patent Application No. 202210659313.2 filed on Jun. 13, 2022, the entire content of which is incorporated herein by reference.

TECHNICAL FIELD

The present disclosure relates to the technical field of pool cleaning, and in particular, to a method of a pool cleaning robot automatic docking, a pool cleaning robot applying the method, an electronic device and a computer storage medium for executing the method.

BACKGROUND

When a traditional pool cleaning robot works underwater, a weight of the pool cleaning robot is large due to a weight of its own machine and a weight of the water filled inside. When the user takes the pool cleaning robot out of the pool, the user needs to bear a large weight burden, which brings a poor user experience. In some products with a cable, a user can pull the pool cleaning robot out of the water by pulling the cable, and if this action is repeated, the life of the pool cleaning robot will be damaged. In addition, there are products that use a long rod with a hook on the head to hook the pool cleaning robot and pull the pool cleaning robot out of the water, this design requires high strength for long rod and hook, and at the same time, users need to hook the pool cleaning robot accurately, resulting in poor experience.

SUMMARY

A first aspect of the present disclosure provides a method of automatic docking a pool cleaning robot, the method includes: placing the pool cleaning robot into a pool; upon receiving a docking instruction, determining a closest pool wall relative to the pool cleaning robot, and enabling the pool cleaning robot to move towards the closest pool wall.

A second aspect of the present disclosure provides a method of automatic docking a pool cleaning robot, the method includes: controlling a pool cleaning robot to move towards a predetermined direction; receiving a docking instruction; determining whether the pool cleaning robot moves towards a direction perpendicular to the pool wall; if a moving direction of the pool cleaning robot is perpendicular to the pool wall, controlling the pool cleaning robot to move to the pool wall until the pool cleaning robot collides the pool wall; if the moving direction of the pool cleaning robot is not perpendicular to the pool wall, controlling the pool cleaning robot to turn relative to the pool wall until the moving direction of the pool cleaning robot is perpendicular to the pool wall.

According to a third aspect of the present disclosure, the present disclosure provides a pool cleaning robot applying the method described in the first aspect or the second aspect of the present disclosure to dock, and the pool cleaning robot body is installed with a gyroscope, a driving motor, an ultrasonic wave sensor, and a controller, where the gyroscope, the driving motor, the ultrasonic sensor, and the controller are all electrically coupled.

According to a fourth aspect of the present disclosure, the present disclosure provides an electronic device including a processor; and a memory storing a program; where the program includes instructions, and the instructions, when executed by the processor, cause the processor to execute the method according to the first aspect or the second aspect of the present disclosure.

According to a fifth aspect of the present disclosure, the present disclosure provides a non-transitory computer-readable storage medium storing computer instructions, where the computer instructions are configured to cause a computer to execute the method according to the first aspect or the second aspect of the present disclosure.

BRIEF DESCRIPTION OF DRAWINGS

Other features, objects and advantages of the present disclosure will become apparent upon reading the following detailed description of non-limiting examples.

DETAILED DESCRIPTION

Figure 1:
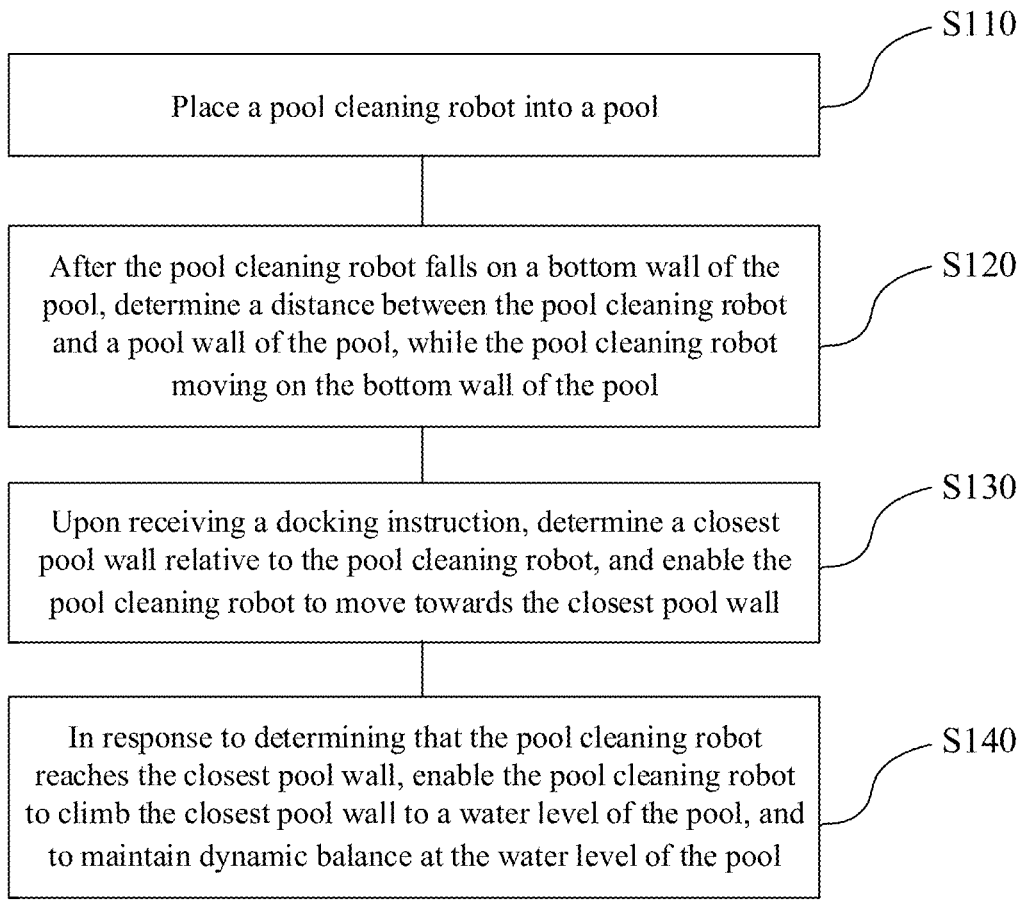
FIG. 1 is a flow diagram of a method of docking a pool cleaning robot according to embodiments of the present disclosure.

In the following description, details are described in order to provide a more thorough understanding of the present disclosure. However, it will be apparent to those skilled in the art that the present disclosure can be implemented without one or more of these details. In other embodiments, some technical features known in the art have not been described in order to avoid obscuring the present disclosure.

In the description of this embodiment, it should be understood that orientation or position relationships indicated by terms such as "central," "longitudinal," "lateral," "upper," "lower," "front," "rear," "left," "right," "vertical," "horizontal," "top," "bottom," "inner," and "outer" are orientation or position relationships based on the accompanying drawings, and are merely used to facilitate description of the present disclosure, rather than indicate or imply that the device or element referred to must have a specific orientation, and be constructed and operated in a specific orientation, and therefore cannot be construed as limitations to the present disclosure.

The present disclosure is to enable a pool cleaning robot to automatically dock and surface, thereby avoiding manually pulling the pool cleaning robot out of the water.

The pool cleaning robot includes a robot body, a driving motor, a sensor unit, a controller, a battery, a moving unit, a memory, a communication unit, a robot interaction unit, a cleaning component, a charging component and so on.

The robot body of the pool cleaning robot can be a rectangular structure, an elliptical structure, a square structure, etc. The structure of the pool cleaning robot can also be symmetrical or asymmetrical. In embodiments of the present disclosure, the robot body is a left-right symmetrical structure.

The cleaning component of the pool cleaning robot is configured to clean the pool surface, including a bottom wall, pool walls, steps, slopes, etc., of the pool. A number of the cleaning component can include one or more. The cleaning component is positioned at the bottom of the pool cleaning robot, for example, at a front side and a rear side of the bottom of the robot body. A drive motor is arranged inside the robot body of the pool cleaning robot, at least two rotating shafts protrude from the bottom of the robot body of the pool cleaning robot, and the cleaning component is sleeved on the rotating shafts. The drive motor can drive the rotating shaft to rotate, so that the rotating shaft drives the cleaning component to rotate.

The cleaning component of the pool cleaning robot includes a sewage suction device, and the sewage suction device includes a water inlet at the bottom of the pool cleaning robot, a dust box and a turbine water pump inside the pool cleaning robot, and a roller brush on the rotating shaft at the bottom of the pool cleaning robot. After the rotating shaft drives the roller brush, the rotating roller brush sweeps the dirt, algae and other dirt in the pool to a vicinity of the water inlet at the bottom of the pool cleaning robot. Due to the suction of the turbine water pump, the dirt is sucked into the water inlet. The dirt enters into the dust box for temporary storage through the water inlet of the pool cleaning robot.

In the embodiments of the present disclosure, the cleaning component of the pool cleaning robot can be configured in a detachable connection manner. The moving unit of the pool cleaning robot is a component related to the movement of the pool cleaning robot, for example, a universal wheel.

The controller is provided inside the pool cleaning robot, and the controller is configured to control the pool cleaning robot to perform specific operations. The controller can be, for example, a central processing unit (CPU), or a microprocessor and so on. The controller is electrically connected with components such as a battery, a memory, a driving motor, a moving unit, and a sensor unit to control these components.

The battery can be installed inside the pool cleaning robot or outside the pool cleaning robot. The battery is configured to power the pool cleaning robot. In some embodiments, the battery is a rechargeable battery, or the battery is a solar cell.

The pool cleaning robot can also be provided with a charging part for obtaining power from external devices.

The memory is provided in the pool cleaning robot, and a program is stored in the memory, and the program is executed by the controller to perform corresponding operations. The memory is also configured to store parameters used by the pool cleaning robot. The memory includes, but is not limited to, a magnetic disk memory, a compact disc read-only memory (CD-ROM), an optical memory, and the like.

The communication unit can be provided in the pool cleaning robot, or can be provided in an external device and is electrically coupled with the pool cleaning robot. The communication unit is configured to allow the pool cleaning robot to communicate with external devices, and the communication unit includes but is not limited to a Wireless-Fidelity (WI-FI) communication module and a short-range communication module. The pool cleaning robot can couple with a WI-FI router through the WI-FI communication module, so as to communicate with external devices such as terminals.

The sensor unit provided on the pool cleaning robot includes various types of sensors, such as collision sensors, distance sensors, counters, and gyroscopes.

The distance sensors can include, for example, ultrasonic distance sensors, which can be configured to measure a distance from an obstacle to the ultrasonic distance sensor. The distance sensors can be provided on the front side, back side, right side and left side of the pool cleaning robot. The distance sensor can also be provided on the top of the pool cleaning robot to measure distance by rotating, such that a distance from an obstacle near the pool cleaning robot to the distance sensor can be measured through the distance sensor.

The inside of the pool cleaning robot is also provided with a counter and a gyroscope. The counter is configured to accumulate a total number of rotation angles (or cycles) of the driving wheel of the moving unit, so as to calculate a distance length that the pool cleaning robot, drove by the driving wheel, have moved. The gyroscope is configured to measure a rotation angle of the pool cleaning robot, such that a direction of the pool cleaning robot can be determined.

It should be understood that the pool cleaning robot described in the embodiment of the present disclosure is merely a schematic example, and does not constitute a specific limitation to the pool cleaning robot of the embodiment of the present disclosure, and the pool cleaning robot of the embodiment of the present disclosure can also be implemented in other manners.

As shown in FIG. 1, in an embodiment of the present disclosure, the method of a pool cleaning robot docking includes steps S110 to S140. At step S110, the pool cleaning robot is placed into the pool. At step S120, after the pool cleaning robot falls on a bottom wall of the pool, the pool cleaning robot determines a distance between the pool cleaning robot and the pool wall of the pool while moving on the bottom wall of the pool. The ultrasonic sensors on the pool cleaning robot emits a plurality of beams of ultrasonic waves, where an ultrasonic beam X1 and an ultrasonic beam X1' are respectively sent out by the ultrasonic sensors positioned on the front side of the pool cleaning robot and the rear side of the pool cleaning robot; an ultrasonic beam X2 and an ultrasonic beam X2' are respectively sent out by the ultrasonic sensors located on the left side of the pool cleaning robot and the right side of the pool cleaning robot. In embodiments of the present disclosure, D1, D1', D2, D2' are understood as distances from corresponding ultrasonic sensors to corresponding pool walls. For example, D1 is understood as the distance between the ultrasonic sensor emitting the ultrasonic beam X1 and the corresponding pool wall.

In actual situations, due to a limited sensing range of the ultrasonic sensor, an actual size of the pool is too large, and an influence of the angle and material of the pool wall, it is possible that that the ultrasonic sensor cannot receive a reflected wave. In this case, if no reflected wave is received, the distance between the ultrasonic sensor and the pool wall is defaulted as infinite.

At step S130, when the pool cleaning robot receives the docking instruction, the pool cleaning robot stops moving, determines the closest pool wall relative to the pool cleaning robot, and moves towards the closest pool wall. FIG. 2a to FIG. 2d illustrate schematic diagrams of a process of the pool cleaning robot turning to dock upon receiving a docking instruction according to embodiments, but the scope of the present disclosure is not limited thereto.

Figure 2A:
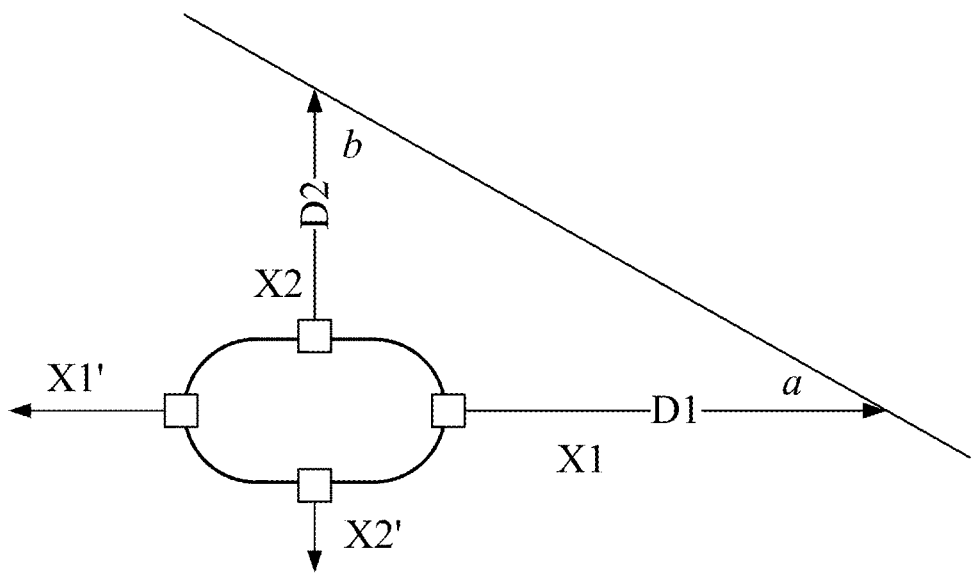
FIG. 2a to FIG. 2e are schematic diagrams of a process of a pool cleaning robot turning to dock upon receiving a docking instruction according to embodiments of the present disclosure.

As shown in FIG. 2a, the pool cleaning robot with the ultrasonic sensor installed thereon is moving based on a predetermined direction (such as the forward direction), the distance between the ultrasonic sensor on the front side of the pool cleaning robot and the pool wall is D1, and the distance between the ultrasonic sensor on the left side of the pool cleaning robot and the pool wall is D2, and D2<D1, the angle between the ultrasonic beam X1 and the pool wall is a, and the angle between the ultrasonic beam X2 and the pool wall is b. The ultrasonic sensor on the rear side of the pool cleaning robot does not receive a reflected wave, thus, D1' can be considered to be infinite.

Figure 2B:
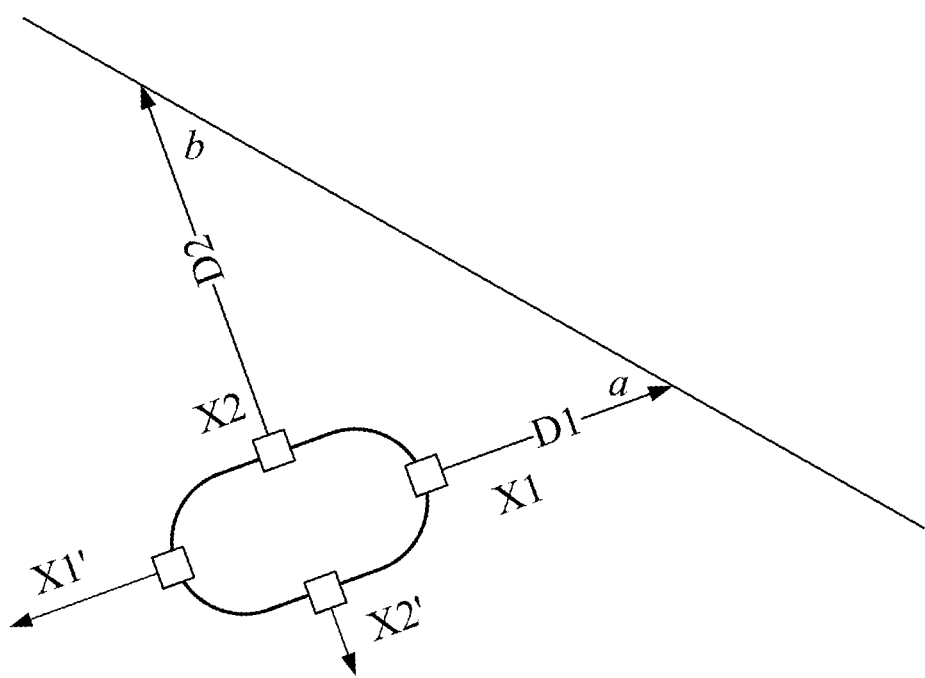

FIG. 2b shows that the drive motors on both sides of the pool cleaning robot adjust a rotational speed and the pool cleaning robot turns to the left. At this time, D2 increases, D1 decreases, the angle a increases, and the angle b decreases.

Figure 2C:
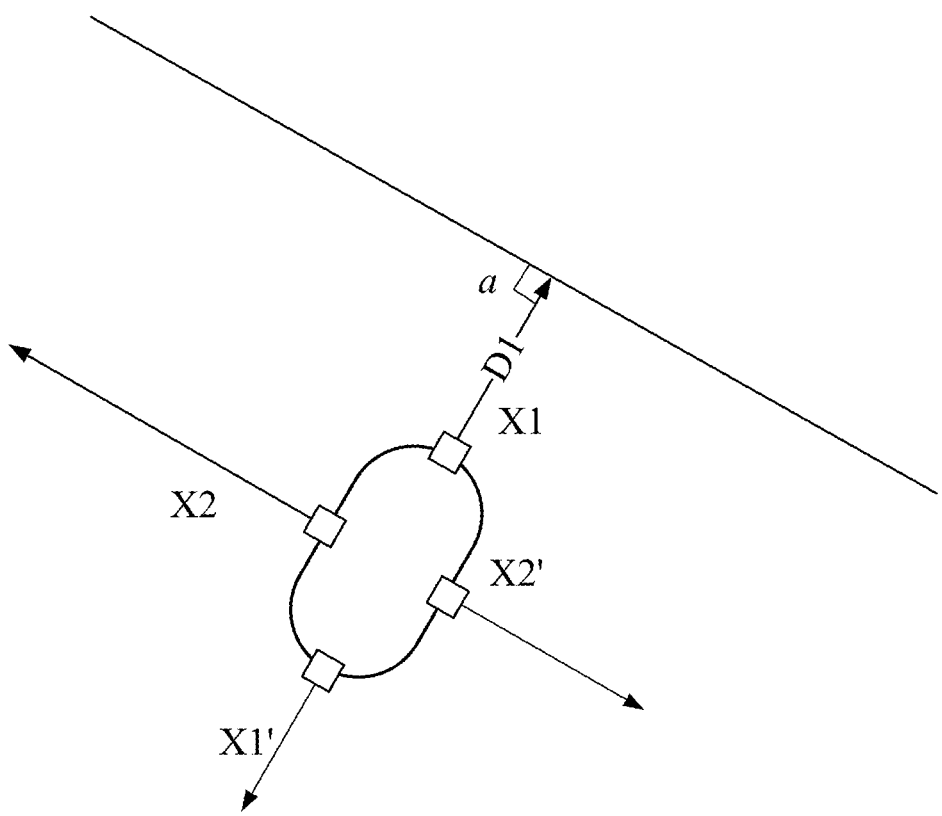

FIG. 2c shows that the ultrasonic beam X1 emitted by the ultrasonic sensor on the front side of the pool cleaning robot is perpendicular to the pool wall. At this time, D2 is infinite, and D1 is the current shortest distance of the pool cleaning robot relative to the pool wall.

Figure 2D:
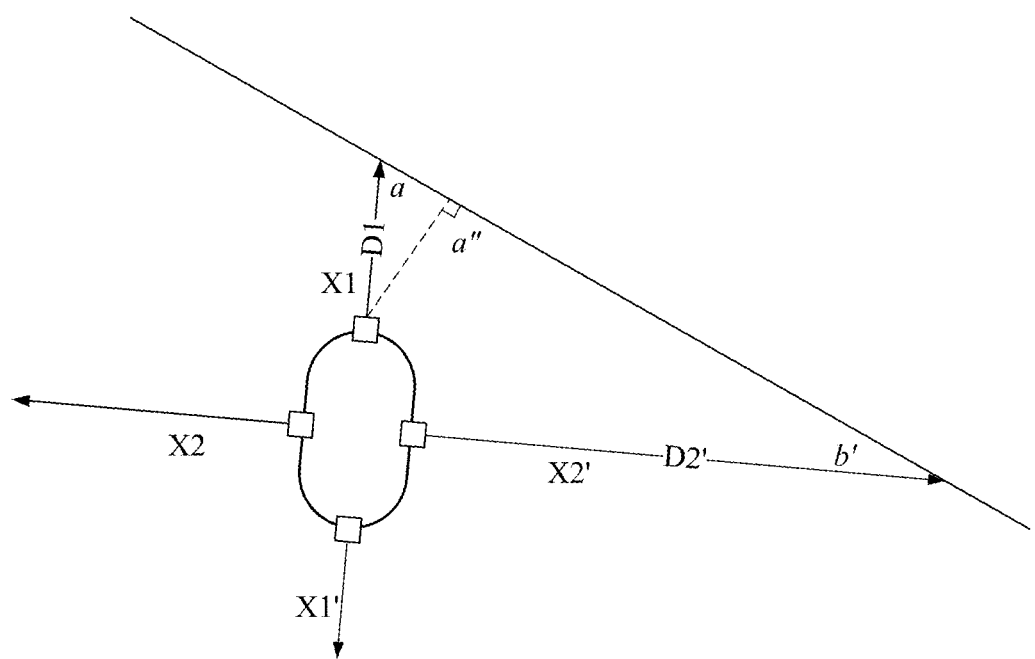
Figure 2E:
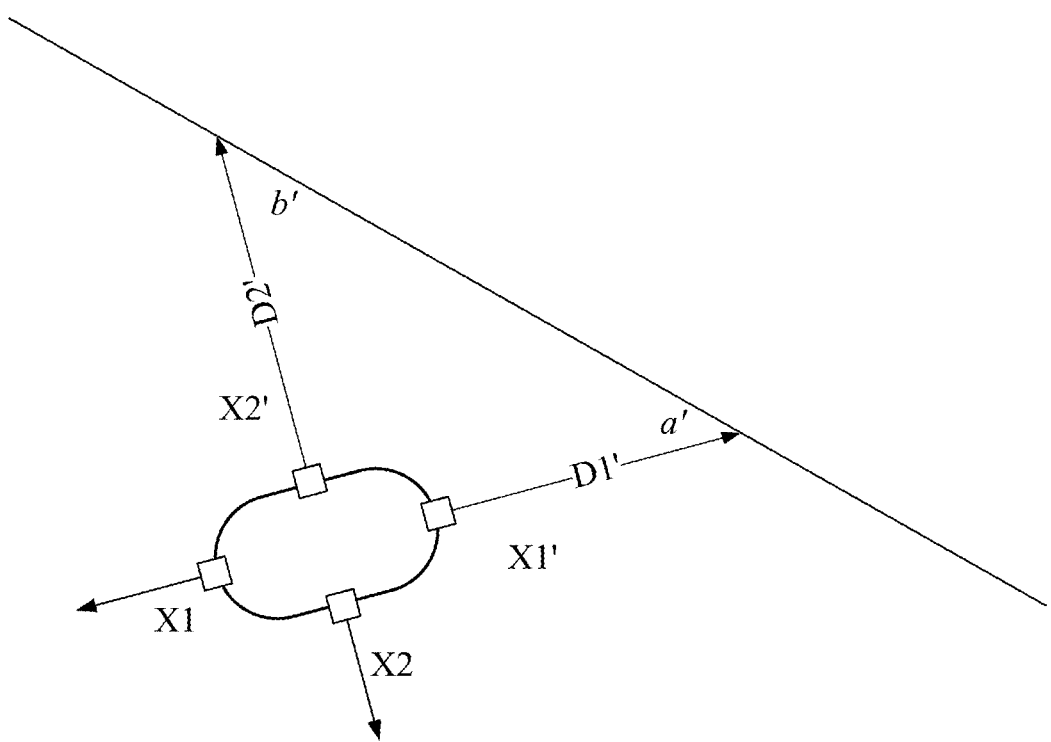

FIG. 2d shows that the pool cleaning robot turns to left relative to that in FIG. 2c, the ultrasonic sensor on the right side of the pool cleaning robot receives the reflected wave, and the distance between the ultrasonic sensor on the right side of the pool cleaning robot and the pool wall is D2'; the distance D1 between the ultrasonic sensor on the front side of the pool cleaning robot and the pool wall increases, and the angle a decreases. In FIG. 2d, the angle a" is a right angle.

Therefore, in some embodiments of the present disclosure, in a case of D1'>D1, when the ultrasonic beam X1 is not the shortest beam among all ultrasonic beams, in other words, in the case that D1 is not the minimum one among D1, D1', D2 and D2', the pool cleaning robot turns to a direction of the shorter one of X2 and X2' until X1 has the shortest value among all ultrasonic beams.

In some embodiments, when X1 is the shortest beam among all ultrasonic beams, that is, D1 is the minimum one among D1, D1', D2, and D2', and D1 is determined as the shortest distance, the pool cleaning robot turns to a first direction, if X1 becomes longer, that is, D1 becomes larger, the pool cleaning robot will turn to an opposite direction of the first direction until D1 is less than or equal to the shortest distance, and the pool cleaning robot moves towards a direction that D1 decreases.

For the pool cleaning robot that can climb on the pool wall by both sides (for example, two-way moving) of the pool cleaning robot, for example, the pool cleaning robot can also move backward, the situation of X1' is similar to that of X1. In a case that the reflected waves can be received by the front and rear ultrasonic sensors, the value of Dr and D1 can be compared. If D1'<D1, it is determined that the pool cleaning robot will move backward during automatic docking; if D1'>D1, the pool cleaning robot moves forward during automatic docking; if D1'=D1, the pool cleaning robot can move forward or backward during automatic docking.

In some embodiments of the present disclosure, the pool cleaning robot can climb on the pool wall through both sides of the pool cleaning robot, for example, two-way driving, X1 represents the ultrasonic beam emitted by the ultrasonic sensor on front side of the pool cleaning robot, and X1' represents the ultrasonic beam emitted by the ultrasonic sensor on rear side of the pool cleaning robot. When the docking instruction is received, it is determined that D1'<D1 and X1' is not the shortest beam among all ultrasonic beams. In other words, Dr is not the minimum one among D1, D1', D2 and D2'. The rear side of the pool cleaning robot turns to a direction of the shorter one of X2 and X2' until X1' has the minimum one among all ultrasonic beams.

When X1' is the shortest beam among all ultrasonic beams, that is, Dr is the minimum one among D1, D1', D2, and D2', Dr is determined as the shortest distance, the rear side of the pool cleaning robot turns to a first direction, if X1' becomes longer, that is, Dr becomes larger, the rear side of the pool cleaning robot will turn to an opposite direction of the first direction until Dr is less than or equal to the shortest distance, and the pool cleaning robot moves towards a direction that Dr decreases.

In the case of receiving the docking instruction, at step S140, after the pool cleaning robot collides with the pool wall, the driving motor increases power, controls the pool cleaning robot to climb the pool wall to the water level of the pool, and controls the pool cleaning robot to maintain dynamic balance at the water level. In addition, controlling the pool cleaning robot to climb the pool wall can further include sensing a change of an inclination angle of the pool cleaning robot through the gyroscope to cause the pool cleaning robot to enter a wall climbing mode. Maintaining dynamic balance at the water level can include sensing that the pool cleaning robot reaches the water level through sensors, the pool cleaning robot staying and timing; when the pool cleaning robot stays for more than a predetermined time period, the timing is stopped and the pool cleaning robot moves to underwater, but the present disclosure is not limited thereto.

In practical applications, the pool cleaning robot can stop moving in response to receiving the docking instruction, rotate in place, and determine the closest pool wall; or the pool cleaning robot can also turn around during the moving process to find the closest pool wall. If D1 is greater than Dr, and Dr is increasing, it means that the current moving direction of the pool cleaning robot is away from the closest pool wall, then the pool cleaning robot can be stopped and rotated in place.

Figure 3:
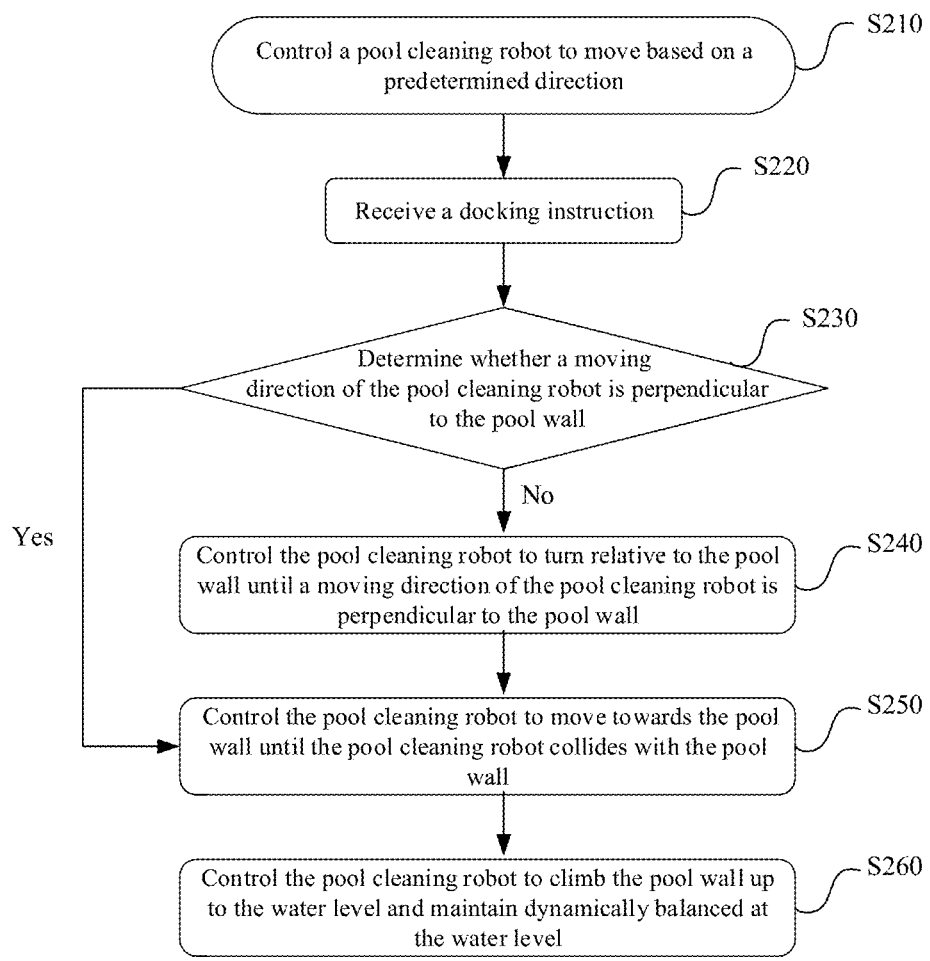
FIG. 3 is a flow diagram of a docking method according to embodiments of the present disclosure.

As shown in FIG. 3, embodiments of the present disclosure provide another method of a pool cleaning robot automatically docking, the method includes steps S210 to S260.

At S210, the pool cleaning robot is controlled to move based on a predetermined direction.

At S220, a docking instruction is received.

At S230, whether the moving direction of the pool cleaning robot is perpendicular to the pool wall is determined; if yes, proceed to S250; if not, proceed to S240.

At S240, the pool cleaning robot is controlled to turn relative to the pool wall until a moving direction of the pool cleaning robot is perpendicular to the pool wall.

At S250, the pool cleaning robot is controlled to move towards the pool wall until the pool cleaning robot collides with the pool wall.

At S260, the pool cleaning robot is controlled to climb the pool wall up to the water level and maintain dynamically balanced at the water level.

Figure 4:
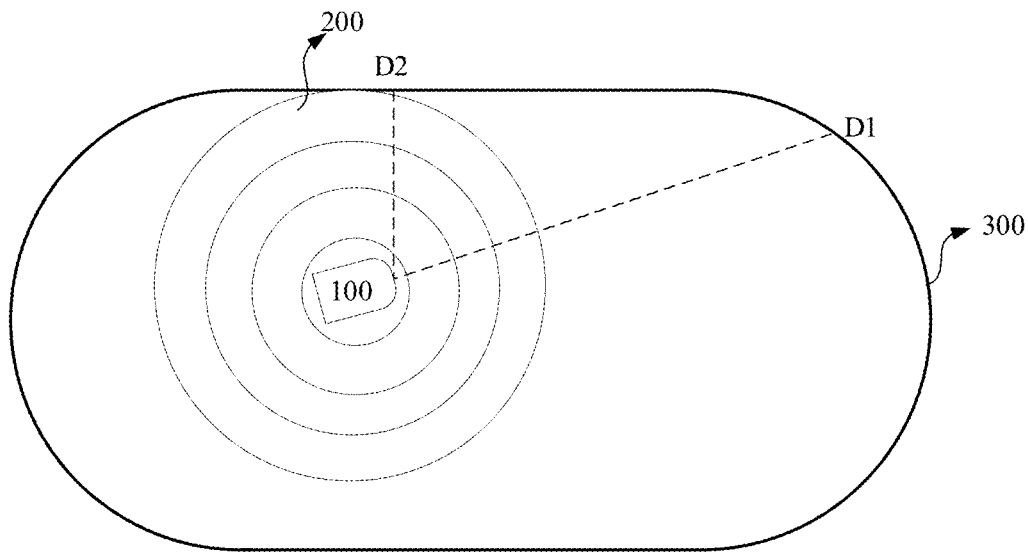
FIG. 4 is a schematic diagram of a process of a pool cleaning robot turning to dock upon receiving a docking instruction at a bottom wall of a pool according to embodiments of the present disclosure.

In FIG. 4, a rotatable scanning ultrasonic sensor is disposed on the top of the pool cleaning robot 100. When the pool cleaning robot 100 is cleaning the pool 300, the pool cleaning robot 100 emits ultrasonic waves 200 to the surrounding water.

The working area of the pool cleaning robot 100 can include the bottom of the pool or the pool walls of the pool.

Before cleaning, a 3D map of the pool has been transmitted to the pool cleaning robot. According to the data of the gyroscope of the pool cleaning robot, the pool cleaning robot can determine its own position, for example, the pool cleaning robot can determine that the pool cleaning robot is located on the bottom wall of the pool, or on the pool wall of the pool.

When the pool cleaning robot 100 cleans the bottom wall of the pool according to a predetermined route, the pool cleaning robot 100 receives a docking instruction.

Based on the pose of the pool cleaning robot determined by the gyroscope of the pool cleaning robot, the pool cleaning robot can use a pool bottom turn mode. When the pool cleaning robot determines that the pool cleaning robot is on the bottom wall of the pool, the pool cleaning robot combines the data of the rotatable scanning ultrasonic sensor configured on the top of the pool cleaning robot to determine the closest route to the pool wall.

In the pool bottom turn mode, the pool cleaning robot is turned to the closest pool wall determined by the rotatable scanning ultrasonic sensor. Due to the limited sensing range of ultrasonic sensors, it is likely that reflected waves will not be received at some positions in the pool. If the reflected wave is not received, the pool cleaning robot continues to clean according to the predetermined route until the reflected wave is received, and then based on the direction of the received reflected wave, the closest pool wall is determined, and the pool cleaning robot is turned to the closest pool wall.

In FIG. 4, the distance that the pool cleaning robot 100 reaches the pool wall according to the predetermined route is D1, but the ultrasonic sensor has already fed back that the moving direction of the pool cleaning robot 100 is perpendicular to the pool wall in the D2 direction, such that the pool cleaning robot is controlled to turn to the D2 direction, thereby shortening a distance between the pool cleaning robot and the pool wall.

Figure 5:
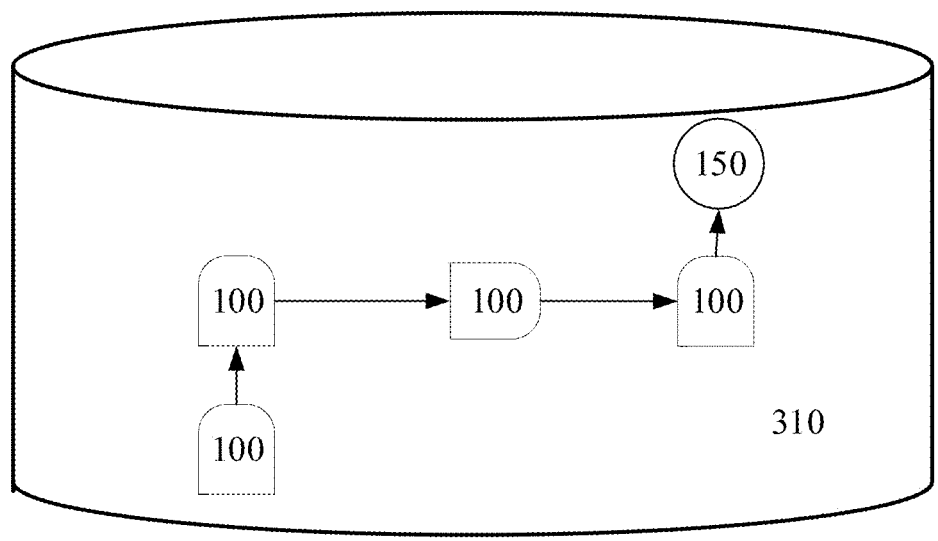
FIG. 5 is a schematic diagram of a process of a pool cleaning robot turning to a docking locator upon receiving a docking instruction on a pool wall according to embodiments of the present disclosure.

As shown in FIG. 5, according to other embodiments of the present disclosure, a docking locator 150 can be installed on the pool wall 310 near the water level of the pool. The pool cleaning robot 100 can climb out of the pool through the docking locator 150, or be fixed in the docking locator. The docking locator 150 is provided with a signal generator and a communication unit for transmitting ultrasonic signals into the water. The communication unit is configured to allow the docking locator 150 to communicate with an external device, and the communication unit includes but is not limited to a wireless-fidelity (Wireless-Fidelity, WI-FI) communication module and a short-range communication module. The docking locator 150 can be coupled with a WI-FI router through a WI-FI communication module, so as to communicate with an external device such as a terminal device. A terminal device communicatively coupled with the pool cleaning robot 100 can simultaneously send a docking instruction to the pool cleaning robot 100 and a starting instruction to the docking locator 150.

If the docking locator 150 is installed on the pool wall 310, after the pool cleaning robot 100 falls on the bottom wall of the pool, the pool cleaning robot 100 cleans the bottom wall 310 according to a predetermined route.

The terminal device communicatively coupled with the pool cleaning robot 100 sends a docking instruction to the pool cleaning robot 100 and sends a start instruction to the docking locator 150 at the same time. After the docking locator 150 is activated, the docking locator 150 transmits ultrasonic signals into the water. When the pool cleaning robot 100 moves within the ultrasonic coverage of the docking locator 150, the pool cleaning robot 100 adjusts the pose and moves to the docking locator 150. When the pool cleaning robot 100 climbs the pool wall to the docking locator 150, the pool cleaning robot 100 can climb out of the pool through the docking locator 150, or be fixed in the docking locator 150.

For some pool cleaning robots provided with handles, the pool cleaning robot 100 can adjust the pose and move in such a way that the handle of the pool cleaning robot faces the water surface. In this way, the user is convenient to lift the pool cleaning robot out of the water.

FIG. 6a to FIG. 6d are schematic diagrams of an interface of a control device coupled with a pool cleaning robot, showing a visual interface of the pool cleaning robot automatically climbing to a water level, according to embodiments of the present disclosure. After the pool cleaning robot 620 receives a docking instruction, the pool cleaning robot 620 docks and climbs up the pool wall 631. A gyroscope and a counter built-in the pool cleaning robot 620 can record an angle and a rising height of the pool cleaning robot. In FIG. 6a to FIG. 6d, the pool wall 631 is gridded, the dark gray area is a stay area for a water level, the medium gray area is an area near the water level, and the light gray area is an underwater area.

A completion degree mark 611 represents the docking completion degree calculated according to the moving speed of the pool cleaning robot 620 and a distance between the pool cleaning robot and the water level. Timer 610 represents a remaining time for the docking instruction.

Figure 6A:
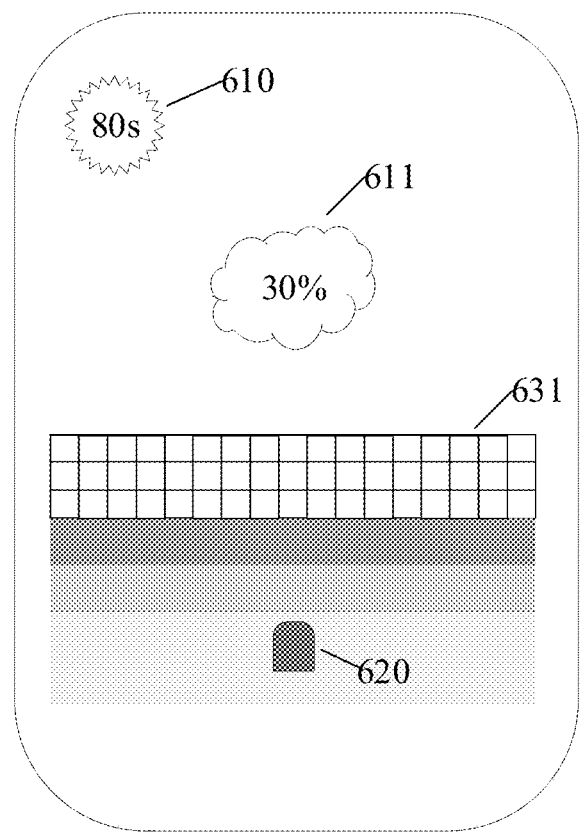
FIG. 6a to FIG. 6d are schematic diagrams of an interface of a control device coupled with a pool cleaning robot, showing a visual interface of the pool cleaning robot automatically climbing to a water level, according to embodiments of the present disclosure.
Figure 6B:
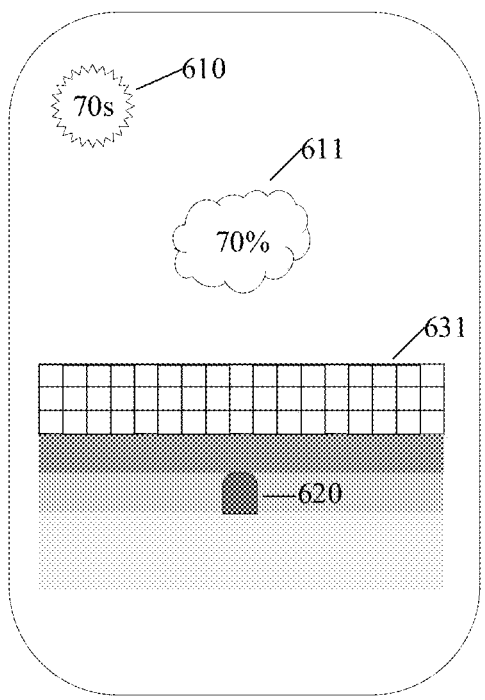
Figure 6C:
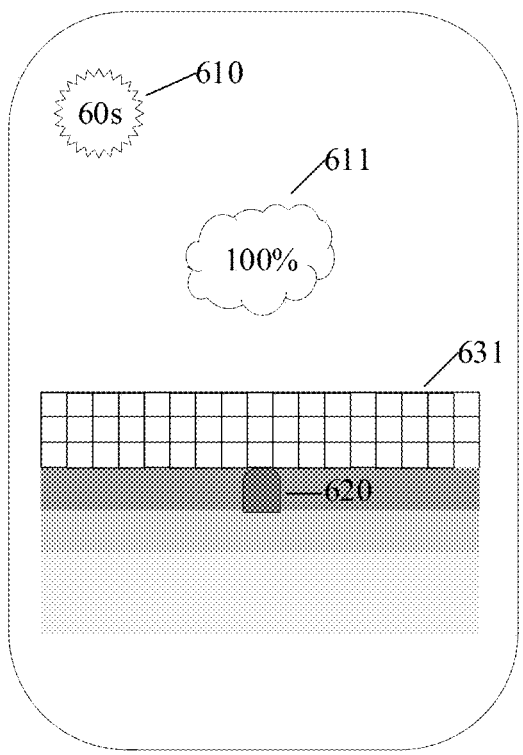
Figure 6D:
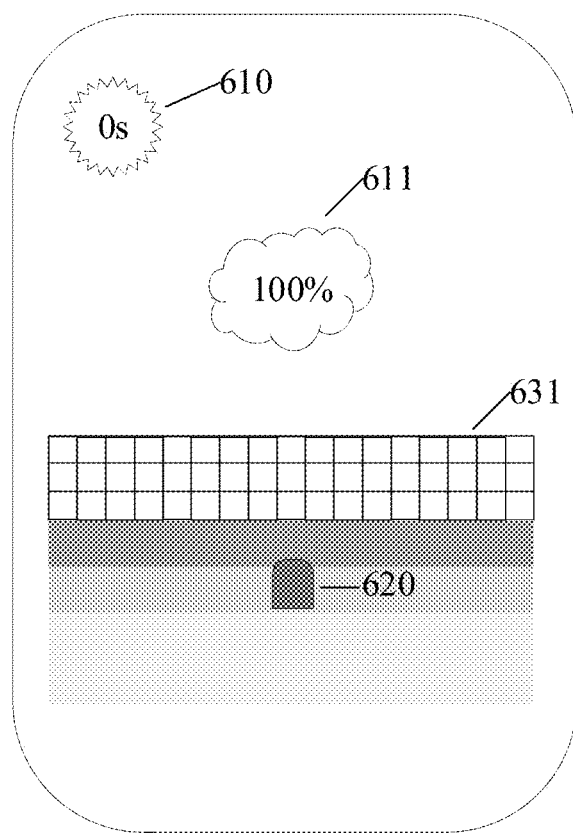

For example, in FIG. 6a, the pool cleaning robot 620 is in the underwater area, the timer 610 shows that the remaining time for the docking instruction is 80s, and the docking completion degree is 30%; in FIG. 6b, the pool cleaning robot 620 enters the area near the water level, and the remaining time for the docking instruction is 70s, and the docking completion degree is 70%; in FIG. 6c, the pool cleaning robot 620 enters the stay area for the water level, and the remaining time for the docking instruction is 60s, the docking completion degree is 100%; in FIG. 6d, the pool cleaning robot 620 waits in the stay area for a timeout and retreats to the underwater, the remaining time for the docking command is 0s, and the docking completion degree is 100%.

In the related art, there has been no digital monitoring of the cleaning process. This is because most sensors used on dock will be failed underwater, and the requirement of the accuracy of underwater cleaning operations is not high. In the design of automatic docking, the design idea is basically to pull the pool cleaning robot out of water by dragging. The present disclosure provides a solution for a pool cleaning robot to stay at the water level and wait for docking by virtue of its own sensor without external force. When receiving a docking instruction, the pool cleaning robot of the present disclosure can automatically find the closest pool wall to dock on without manual intervention. With this method, convenience is brought to the cleaning work of the user, possible damage to the pool cleaning robot caused by dragging is avoided as much as possible, and the service life of the pool cleaning robot is improved.

In other embodiments of the present disclosure, the stay area for the water level, the area near to the water level, and the underwater area may not be distinguished. Because when the pool cleaning robot moves to the water level, due to the effects of buoyancy and gravity, the sensor can sense that the pool cleaning robot has reached the water level. Therefore, in a simplified embodiment of the present disclosure, when the pool cleaning robot reaches the water level, the pool cleaning robot starts timing. If the user does not lift the pool cleaning robot out of the water within a predetermined time, the automatic docking procedure ends, and the pool cleaning robot retreat t to continue cleaning work. In other embodiments, when the user lifts the pool cleaning robot from the water surface, the pool cleaning robot will have a corresponding "quick drainage" design to drain the water inside the pool cleaning robot, such that the overall weight of the pool cleaning robot is reduced, which is convenient for a user to lift.

Embodiments of the present disclosure can be implemented in one or a combination of hardware, firmware, and software. Embodiments can also be implemented as instructions stored on a computer-readable storage device that can be read and executed by at least one processor to perform the operations described herein. A computer-readable storage device can include any non-transitory mechanism for storing information in a form readable by a machine (e.g., a computer). For example, the computer-readable storage device can include read only memory (ROM), RAM, magnetic disk storage media, optical storage media, flash memory devices, and other storage devices and media. In some embodiments, one or more processors can be included and can be configured with instructions stored on a computer-readable storage device.

Although embodiments have been described with reference to specific examples and embodiments, it is obvious that various modifications and changes can be made to these embodiments without departing from the broader scope of the present disclosure. Accordingly, the specification and drawings are to be regarded in an illustrative rather than a restrictive sense. The accompanying drawings, which form a part of this specification, illustrate embodiments of topics that can be practiced in an illustrative rather than restrictive manner. The illustrated embodiments are described in sufficient detail to enable those skilled in the art to practice the teachings disclosed herein. Other embodiments can be utilized and derived therefrom, such that structural and logical substitutions and changes can be made without departing from the scope of the present disclosure.

As used herein, the terms "a" or "an" are used to include one or more than one without regard to any other instance or usage of "at least one" or "one or more." In this specification, the term "or" is used to refer to a non-exclusive "or", and "A and/or B" includes "A", "B" and "A and B" unless otherwise stated. Herein, the terms "including" and "wherein" are used as equivalents of the corresponding terms "including" and "in which". Also, in the following claims, the terms "comprising" and "containing" are open ended. Furthermore, in the following claims, the terms "first," "second," and "third," etc. are used merely as labels and are not intended to impose numerical requirements on their objects.

What is claimed is:

1. A method of automatic docking a pool cleaning robot, comprising:
    placing the pool cleaning robot into a pool;
    upon receiving a docking instruction, determining a closest pool wall relative to the pool cleaning robot, and enabling the pool cleaning robot to move towards the closest pool wall; and
    enabling an ultrasonic sensor on a front side of the pool cleaning robot to emit a first ultrasonic beam to measure a first distance between the front side of the pool cleaning robot and a first pool wall, an ultrasonic sensor on a rear side of the pool cleaning robot to emit a second ultrasonic beam to measure a second distance between the rear side of the pool cleaning robot and a second pool wall, an ultrasonic sensor on a left side of the pool cleaning robot to emit a third ultrasonic beam to measure a third distance between the left side of the pool cleaning robot and a third pool wall, and an ultrasonic sensor on a right side of the pool cleaning robot to emit a fourth ultrasonic beam to measure a fourth distance between the right side of the pool cleaning robot and a fourth pool wall;
    wherein upon receiving the docking instruction, determining the closest pool wall relative to the pool cleaning robot, and enabling the pool cleaning robot to move towards the closest pool wall comprises:
        in response to receiving the docking instruction, determining whether the first distance is less than the second distance;
        in response to determining that the first distance is less than the second distance, determining whether the first distance is a minimum one among the first distance, the second distance, the third distance and the fourth distance;
        in response to determining that the first distance is not the minimum one among the first distance, the second distance, the third distance, and the fourth distance, controlling the pool cleaning robot to turn to a direction corresponding to a smaller one between the third distance and the fourth distance, until the first distance is the minimum one among the first distance, the second distance, the third distance and the fourth distance; and
        enabling the pool cleaning robot to move towards the closest pool wall.

2. The method of claim 1, further comprising:
    in response to determining that the pool cleaning robot reaches the closest pool wall, enabling the pool cleaning robot to climb the closest pool wall to a water level of the pool, and to maintain dynamic balance at the water level of the pool.

3. The method of claim 2, further comprising:
    in response to determining that the pool cleaning robot has reached the water level for a preset time period and the pool cleaning robot has not been lifted out of water, enabling the pool cleaning robot to retreat to continue cleaning work.

4. The method of claim 2, further comprising:
    during a process of the pool cleaning robot being lifted out of water, enabling the pool cleaning robot to automatically drain water.

5. The method of claim 1, wherein ultrasonic sensors are arranged on a body of the pool cleaning robot, and the ultrasonic sensors are respectively positioned on a front side, a rear side, a right side and a left side of the pool cleaning robot.

6. The method of claim 5, wherein upon receiving the docking instruction, determining the closest pool wall of the pool cleaning robot, and enabling the pool cleaning robot to move towards the closest pool wall comprises:
    upon receiving the docking instruction,
    measuring a first distance between the front side of the pool cleaning robot and a first pool wall by the ultrasonic sensors,
    measuring a second distance between the rear side of the pool cleaning robot and a second pool wall by the ultrasonic sensors,
    determining a pool wall corresponding to a shortest distance in the first distance and the second distance as the closest pool wall, and enabling the pool cleaning robot to move towards the closest pool wall along a direction perpendicular to the closest pool wall.

7. The method of claim 1, wherein
the first ultrasonic beam is perpendicular to the front side of the pool cleaning robot, the second ultrasonic beam is perpendicular to the rear side of the pool cleaning robot, the third ultrasonic beam is perpendicular to the left side of the pool cleaning robot, and the fourth ultrasonic beam is perpendicular to the right side of the pool cleaning robot.

8. The method of claim 1, further comprising:
in response to determining that the first distance is the minimum one among the first distance, the second distance, the third distance and the fourth distance, determining the first distance to be a shortest distance, and controlling the pool cleaning robot turn to a first direction;
in response to determining that the first distance becomes larger during the pool cleaning robot turning to the first direction, controlling the pool cleaning robot to turn to an opposite direction of the first direction until the first distance is less than or equal to the shortest distance; and
enabling the pool cleaning robot to move towards a direction in which the first distance decreases.

9. A pool cleaning robot, wherein the pool cleaning robot is configured to perform operations comprising:
moving on a bottom wall of a pool;
calculating a distance between the pool cleaning robot and a pool wall of the pool;
upon receiving a docking instruction, determining a closest pool wall relative to the pool cleaning robot, and enabling the pool cleaning robot to move towards the closest pool wall; and
enabling an ultrasonic sensor on a front side of the pool cleaning robot to emit a first ultrasonic beam to measure a first distance between the front side of the pool cleaning robot and a first pool wall, an ultrasonic sensor on a rear side of the pool cleaning robot to emit a second ultrasonic beam to measure a second distance between the rear side of the pool cleaning robot and a second pool wall, an ultrasonic sensor on a left side of the pool cleaning robot to emit a third ultrasonic beam to measure a third distance between the left side of the pool cleaning robot and a third pool wall, and an ultrasonic sensor on a right side of the pool cleaning robot to emit a fourth ultrasonic beam to measure a fourth distance between the right side of the pool cleaning robot and a fourth pool wall;
wherein upon receiving the docking instruction, determining the closest pool wall relative to the pool cleaning robot, and enabling the pool cleaning robot to move towards the closest pool wall comprises:
in response to receiving the docking instruction, determining whether the first distance is less than the second distance;
in response to determining that the first distance is less than the second distance, determining whether the first distance is a minimum one among the first distance, the second distance, the third distance and the fourth distance;
in response to determining that the first distance is not the minimum one among the first distance, the second distance, the third distance, and the fourth distance, controlling the pool cleaning robot to turn to a direction corresponding to a smaller one between the third distance and the fourth distance, until the first distance is the minimum one among the first distance, the second distance, the third distance and the fourth distance; and
enabling the pool cleaning robot to move towards the closest pool wall.

10. The pool cleaning robot of claim 9, wherein the pool cleaning robot further performs operations comprising:
in response to determining that the pool cleaning robot reaches the closest pool wall, climbing the closest pool wall to a water level of the pool, and maintaining dynamic balance at the water level of the pool.

11. The pool cleaning robot of claim 10, wherein the pool cleaning robot further performs operations comprising:
in response to determining that the pool cleaning robot has reached the water level for a preset time period and the pool cleaning robot has not been lifted out of water, retreating to continue cleaning work.

12. The pool cleaning robot of claim 10, wherein the pool cleaning robot further performs operations comprising:
during a process of the pool cleaning robot being lifted out of water, automatically draining water.

13. The pool cleaning robot of claim 9, wherein upon receiving a docking instruction, determining a closest pool wall relative to the pool cleaning robot, and enabling the pool cleaning robot to move towards the closest pool wall, comprises:
upon receiving the docking instruction,
measuring a first distance between the front side of the pool cleaning robot and a pool wall by the ultrasonic sensor,
measuring a second distance between the rear side of the pool cleaning robot and a pool wall by the ultrasonic sensor,
determining a pool wall corresponding to a shortest distance in the first distance and the second distance as the closest pool wall, and
moving towards the closest pool wall along a direction perpendicular to the closest pool wall.

14. The pool cleaning robot of claim 9, wherein
the first ultrasonic beam is perpendicular to the front side of the pool cleaning robot, the second ultrasonic beam is perpendicular to the rear side of the pool cleaning robot, the third ultrasonic beam is perpendicular to the left side of the pool cleaning robot, and the fourth ultrasonic beam is perpendicular to the right side of the pool cleaning robot.

15. The pool cleaning robot of claim 9, wherein the pool cleaning robot further performs operations comprising:
in response to determining that the first distance is the minimum one among the first distance, the second distance, the third distance and the fourth distance, determining that the first distance is a shortest distance, and turning to a first direction;
in response to determining that the first distance becomes larger during the pool cleaning robot turning to the first direction, turning to an opposite direction of the first direction until the first distance is less than or equal to the shortest distance;
moving towards a direction in which the first distance decreases.

16. The method of claim 1, wherein upon receiving the docking instruction, the method further comprises:
in response to determining that a moving direction of the pool cleaning robot is perpendicular to the closest pool wall, controlling the pool cleaning robot to move toward the closest pool wall until the pool cleaning robot collides with the closest pool wall; and in response to determining that the moving direction of the pool cleaning robot is not perpendicular to the closest pool wall, controlling the pool cleaning robot to turn relative to the closest pool wall until the moving direction of the pool cleaning robot is perpendicular to the closest pool wall.

17. An electronic device comprising a processor; and a memory storing a program; wherein the program comprises instructions, and the instructions, when executed by the processor, cause the processor to perform operations comprising:

controlling a pool cleaning robot to move on a bottom wall of a pool;

calculating a distance between the pool cleaning robot and a pool wall of the pool; and upon receiving a docking instruction, determining a closest pool wall relative to the pool cleaning robot, and enabling the pool cleaning robot to move towards the closest pool wall; and enabling an ultrasonic sensor on a front side of the pool cleaning robot to emit a first ultrasonic beam to measure a first distance between the front side of the pool cleaning robot and a first pool wall, an ultrasonic sensor on a rear side of the pool cleaning robot to emit a second ultrasonic beam to measure a second distance between the rear side of the pool cleaning robot and a second pool wall, an ultrasonic sensor on a left side of the pool cleaning robot to emit a third ultrasonic beam to measure a third distance between the left side of the pool cleaning robot and a third pool wall, and an ultrasonic sensor on a right side of the pool cleaning robot to emit a fourth ultrasonic beam to measure a fourth distance between the right side of the pool cleaning robot and a fourth pool wall;

wherein upon receiving the docking instruction, determining the closest pool wall relative to the pool cleaning robot, and enabling the pool cleaning robot to move towards the closest pool wall comprises:

in response to receiving the docking instruction, determining whether the first distance is less than the second distance;

in response to determining that the first distance is less than the second distance, determining whether the first distance is a minimum one among the first distance, the second distance, the third distance and the fourth distance;

in response to determining that the first distance is not the minimum one among the first distance, the second distance, the third distance, and the fourth distance, controlling the pool cleaning robot to turn to a direction corresponding to a smaller one between the third distance and the fourth distance, until the first distance is the minimum one among the first distance, the second distance, the third distance and the fourth distance; and enabling the pool cleaning robot to move towards the closest pool wall.

* * * * *